(12) United States Patent
Yamashita

(10) Patent No.: US 12,285,143 B2
(45) Date of Patent: Apr. 29, 2025

(54) WIPING SHEET AND METHOD FOR PRODUCING WIPING SHEET

(71) Applicant: DAIO PAPER CORPORATION, Shikokuchuo (JP)

(72) Inventor: Shoko Yamashita, Shikokuchuo (JP)

(73) Assignee: DAIO PAPER CORPORATION, Shikokuchuo (JP)

( * ) Notice: Subject to any disclaimer, the term of this patent is extended or adjusted under 35 U.S.C. 154(b) by 509 days.

(21) Appl. No.: 17/632,984

(22) PCT Filed: Aug. 20, 2020

(86) PCT No.: PCT/JP2020/031395
§ 371 (c)(1),
(2) Date: Feb. 4, 2022

(87) PCT Pub. No.: WO2021/039564
PCT Pub. Date: Mar. 4, 2021

(65) Prior Publication Data
US 2022/0273154 A1  Sep. 1, 2022

(30) Foreign Application Priority Data
Aug. 30, 2019  (JP) .................. 2019-158117

(51) Int. Cl.
*A47L 13/16* (2006.01)
*A47L 13/17* (2006.01)
*D06M 17/00* (2006.01)
*B29C 70/12* (2006.01)
(Continued)

(52) U.S. Cl.
CPC ............. *A47L 13/17* (2013.01); *D06M 17/00* (2013.01); *B29C 70/12* (2013.01); *B32B 5/022* (2013.01); *B32B 7/05* (2019.01)

(58) Field of Classification Search
CPC ......... A47L 13/16; A47L 13/17; B29C 70/12; B32B 5/022
See application file for complete search history.

(56) References Cited

U.S. PATENT DOCUMENTS 10,093,066 B2 * 10/2018 Lim ................... D04H 1/43835
2006/0240223 A1 * 10/2006 Tuman .................... A47L 13/16
428/143

(Continued)

FOREIGN PATENT DOCUMENTS

JP   2002-496 A    1/2002
JP   3768783 B2    4/2006

(Continued)

OTHER PUBLICATIONS

Extended European Search Report issued on Aug. 19, 2022 in corresponding European Application No. 20858760.0; 7 pages.

(Continued)

*Primary Examiner* — Michael D Jennings
(74) *Attorney, Agent, or Firm* — Maier & Maier, PLLC

(57) ABSTRACT

A wiping sheet having a plurality of nonwoven fabrics that are stacked and bonded together includes cellulose nanofiber that is included in an applied part where adjacent nonwoven fabrics among the nonwoven fabrics are bonded. At least one of the adjacent nonwoven fabrics is a spunlace nonwoven fabric.

8 Claims, 1 Drawing Sheet

(51) Int. Cl.
*B32B 5/02* (2006.01)
*B32B 7/05* (2019.01)

(56) References Cited

U.S. PATENT DOCUMENTS

| | | | |
|---|---|---|---|
| 2006/0286884 A1* | 12/2006 | Thioliere | B24D 11/00 |
| | | | 442/314 |
| 2009/0264036 A1* | 10/2009 | Yano | H05K 1/0366 |
| | | | 162/1 |
| 2010/0287721 A1* | 11/2010 | Lewis | B32B 9/04 |
| | | | 15/228 |
| 2011/0117319 A1* | 5/2011 | Yano | D21H 11/08 |
| | | | 428/141 |
| 2011/0217895 A1* | 9/2011 | Peterson | A47L 13/16 |
| | | | 442/401 |
| 2016/0221213 A1* | 8/2016 | Nakamura | D04H 1/425 |
| 2017/0050221 A1* | 2/2017 | Naskrent | B08B 1/143 |
| 2017/0181595 A1* | 6/2017 | Hoying | B32B 5/18 |
| 2018/0094369 A1* | 4/2018 | Horridge | D04H 1/46 |
| 2019/0178434 A1* | 6/2019 | Sakatani | C04B 41/009 |
| 2019/0298142 A1* | 10/2019 | Policicchio | B32B 7/05 |
| 2020/0046194 A1* | 2/2020 | Busby | B32B 7/12 |

FOREIGN PATENT DOCUMENTS

| | | | | | |
|---|---|---|---|---|---|
| JP | 2010220903 A | 10/2010 | | | |
| JP | 2012-197544 A | 10/2012 | | | |
| JP | 2016-151070 A | 8/2016 | | | |
| JP | 2018-86203 A | 6/2018 | | | |
| JP | 2018-104846 A | 7/2018 | | | |
| JP | 2018-123448 A | 8/2018 | | | |
| JP | 2018171126 A | 11/2018 | | | |
| JP | 2019-060044 A | 4/2019 | | | |
| WO | WO-2018182761 A1 * | 10/2018 | | | A47L 13/16 |
| WO | WO-2019120375 A1 * | 6/2019 | | | A47L 13/16 |

OTHER PUBLICATIONS

Office Action issued on May 31, 2022 in corresponding Japanese Application No. 2019-158117; 5 pages including English-language translation.
Office Action issued on Apr. 4, 2023, in corresponding Chinese Application No. 202080059794.2, 14 pages.
Decision of Refusal issued on Jan. 31, 2023, in corresponding Japanese Application No. 2019-158117, 4 pages.
International Preliminary Report on Patentability with English-language translation issued on Mar. 1, 2022, in corresponding International Application No. PCT/JP2020/031395;10 pages.
International Search Report dated Oct. 27, 2020 of corresponding application No. PCT/JP2020/031395; 5 pgs.
Office Action issued on Nov. 15, 2022, in corresponding Japanese Application No. 2019158117, 5 pages.
Office Action issued on Sep. 29, 2023, in corresponding Chinese Application No. 202080059794.2, 10 pages.
Office Action issued on Sep. 30, 2024, in corresponding Korean Application No. 10-2022-7003583, 11 pages.

* cited by examiner

WIPING SHEET AND METHOD FOR PRODUCING WIPING SHEET

TECHNICAL FIELD

The present invention relates to a wiping sheet and a method for producing the wiping sheet.

BACKGROUND

There are several methods of making a wiping sheet having a multilayered structure, such as thermal fusion of non-woven fabrics as raw materials to each other (see Patent Document 1), bonding nonwoven fabrics to each other with hot melt adhesives (see Patent Document 2), and the like.

CITATION LIST

Patent Literature

[Patent Document 1] JP 2019-060044 A
[Patent Document 2] JP 2018-104846 A

SUMMARY

However, when nonwoven fabrics are thermally fused together, it is necessary to prepare them in a facility for manufacturing nonwoven fabrics before processing. In bonding the nonwoven fabrics together by means of hot melt adhesives, there are problems such as peculiar odor and hardening of the bonded surface.

An object of the present invention is to provide a wiping sheet having a multilayered structure that is easy to produce and having a soft bonded surface, and a method for producing such a wiping sheet.

In order to achieve the object, according to the invention, there is provided a wiping sheet having a plurality of nonwoven fabrics that are stacked and bonded together, including:

cellulose nanofiber that is included in a bonded part of adjacent nonwoven fabrics,
wherein at least one of the adjacent nonwoven fabrics is a spunlace nonwoven fabric.

According to the invention, the wiping sheet is a wet sheet.

According to the invention, in the wiping sheet, the bonded part is formed on an entire periphery of nonwoven fabrics.

According to the invention, in the wiping sheet, the adjacent nonwoven fabrics are both spunlace nonwoven fabrics.

According to the invention, a method for producing a wiping sheet includes:

applying cellulose nanofiber solution of 0.5% to 2.0% to a nonwoven fabric according to a pattern that has been set;
superposing the nonwoven fabric to which the cellulose nanofiber solution is applied and another nonwoven fabric such that a surface to which the cellulose nanofiber solution has been applied is in contact with the another nonwoven fabric; and
drying including thermal drying and bonding of superposed nonwoven fabrics,
and at least one of the nonwoven fabrics that are superposed is a spunlace nonwoven fabric.

According to the invention, the method for producing a wiping sheet includes: impregnating the wiping sheet with a chemical solution.

According to the invention, in the method for producing a wiping sheet, in the applying, the cellulose nanofiber solution is applied by means of a spray.

According to the present invention, it is possible to provide a wiping sheet having a multilayered structure that is easy to manufacture and has a soft bonded surface, and to a method of manufacturing the wiping sheet.

DETAILED DESCRIPTION

[Wiping Sheet]

A wiping sheet P of the present invention having a multilayered structure is made by applying a solution in which cellulose nanofiber (hereinafter referred to as CNF) are added to purified water to one surface of a fiber assembling base material in a shape of a sheet such as a nonwoven fabric, for example, superposed on another nonwoven fabric on the applied surface, and bonding them by means of thermal drying.

Figure 1A:
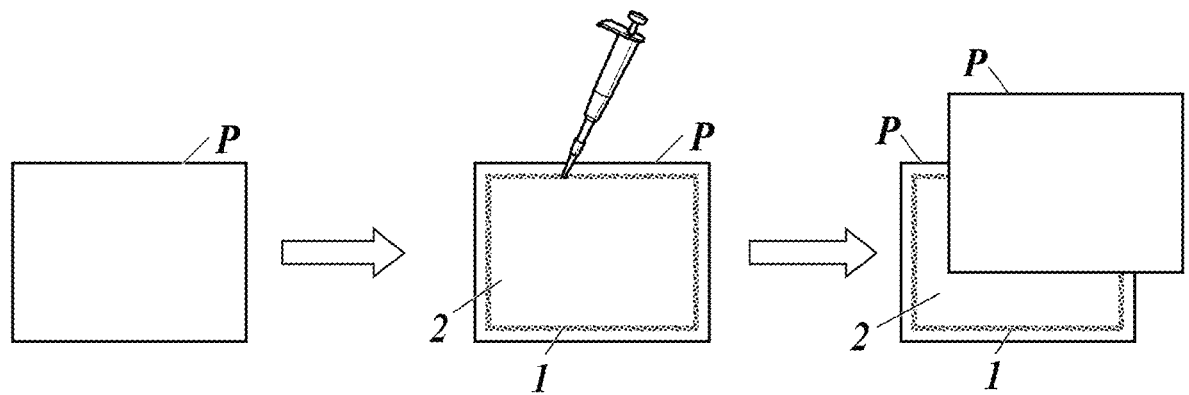
FIG. 1A shows an example of a method for producing a wiping sheet according to an embodiment.

As shown in FIG. 1A, for example, the wiping sheet P has an applied part(s) 1 on the entire periphery of the nonwoven fabric and a non-applied part(s) 2 other than the applied part 1.

The applied part 1 to which a CNF solution is applied has higher hydrophilicity and higher moisture absorbency than the non-applied part 2.

The non-applied part 2 to which the CNF solution is not applied has lower hydrophilicity and lower moisture absorbency than the non-applied part 2.

Figure 1B:
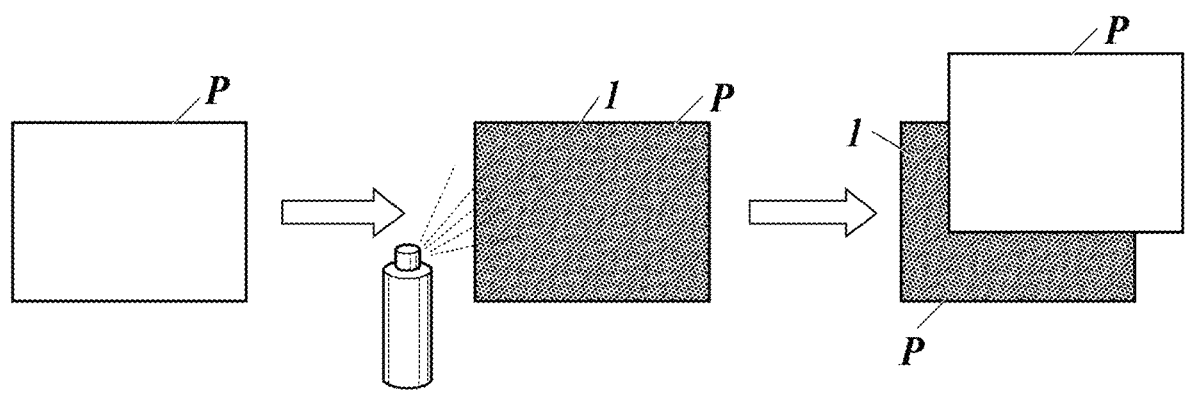
FIG. 1B shows an example of a method for producing a wiping sheet according to an embodiment.

The CNF solution may be applied to the entire surface of the wiping sheet P as shown in FIG. 1B, such that the wiping sheet P has only the applied part 1.

The wiping sheets P as a product is formed into a stack of a plurality of sheets so as to be stored in a packaging means that has a sheet outlet and can be sealed by an open/close lid, such as a sealed container or a bag.

For use, a user opens the outlet and pulls out a sheet in the container or bag directly containing the wiping sheets P, or in a container containing a bag directly containing the wiping sheets P.

Such wiping sheets P can be used for a variety of purposes, for example, as body wiping sheets, cleaning sheets for floors, and the like.

[Fiber Assembling Base Material]

The fiber assembling base material may be a nonwoven fabric made of predetermined fiber as a fiber material. The nonwoven fabric is manufactured by using a well-known technology such as spunlace, air through, air laid, point bond, spunbond, needle punch, or the like.

The predetermined fiber may be any natural, recycled, or synthetic fiber. The predetermined fiber is, for example, cellulose fiber such as rayon, lyocell, tencel, and cotton; polyolefin fiber such as polyethylene, polypropylene, and polyvinyl alcohol; polyester fiber such as polyethylene terephthalate and polybutylene terephthalate; and polyamide fiber such as nylon. These can be used alone or in combination of two or more kinds of these.

In the present invention, hydrophilic fiber is preferably contained at least. This is because a nonwoven fabric containing hydrophilic fiber is more effective in wiping off dirt than a nonwoven fabric that does not contain hydrophilic fiber.

(Hydrophilic Fiber)

The hydrophilic fiber may be natural fiber such as cotton and pulp, and recycled fiber such as rayon and cupra. Among these kinds of fiber, rayon is particularly preferred. Rayon is highly water-absorbent and easy to be handled, and fibers of a certain length can be obtained at a low cost. Such hydrophilic fiber is preferably blended in the base material at a content ratio of 40 to 70% by mass. When the hydrophilic fiber is contained at a content of less than 40% by mass, sufficient flexibility or water retention cannot be exhibited. When the hydrophilic fiber is contained at a content of more than 70% by mass, the sheet has too small wet strength and is easy to be torn, so as to be stretched too much when taken out from the container by a pop-up method.

(Basis Weight)

A basis weight of the wiping sheet P of the present invention is preferably 20 to 80 $g/m^2$, and particularly preferably 30 to 60 $g/m^2$. When the basis weight of the sheet is less than 20 $g/m^2$, the ability of the sheet to retain dirt becomes poor, and when the basis weight of the sheet exceeds 80 $g/m^2$, the softness of the sheet becomes poor.

[CNF]

The CNF is a material having a moisture retaining property, being highly safe, having a thixotropic property when dissolved in water, and made of fine cellulose fibers obtained by fibrillation of pulp fiber. Generally, cellulose fiber containing cellulose fine fibers whose fiber width is nano-scale (1 nm or more and 1000 nm or less) is referred to as the CNF, and an average of the fiber width is preferably less than 100 nm. The average fiber width is calculated from a certain number of fibers by using, for example, a number average, a median, or a mode diameter (the value that appears most often).

(Pulp Fiber Used for CNF)

Examples of pulp fiber that can be used as CNF include: chemical pulp such as hardwood pulp (LBKP) and conifer pulp (NBKP); mechanical pulp such as bleached thermo-mechanical pulp (BTMP), stone ground pulp (SGP), pressurized stone ground pulp (PGW), refiner ground pulp (RGP), chemi-ground pulp (CGP), thermo-ground pulp (TGP), ground pulp (GP), thermo-mechanical pulp (TMP), chemi-thermo-mechanical pulp (CTMP), refiner mechanical pulp (RMP); used paper pulp made from used brown paper, used craft envelope paper, used magazine paper, used newsprint paper, used leaflet paper, used office paper, used corrugated paper, used woodfree paper, used Kent paper, used simili paper, used grey cardboard paper, used coarse paper, and the like; and deinked pulp (DIP) made by deinking used paper pulp. These may be used alone or in combination or two or more, as long as the effects of the invention are not impaired.

(Fibrillation Method)

The fibrillation method used in manufacturing the CNF may be, but are not limited to, a mechanical method such as high-pressure homogenizer method, microfluidizer method, grinder grinding method, bead mill freezing and pulverizing method, and ultrasonic fibrillation method.

CNF that has been only mechanically treated by the above fibrillation methods (in other words, CNF that has not been modified), namely, CNF that has been subjected to no modification with functional groups, has higher thermal stability and therefore can be used in a wider range of applications than CNF that has been subjected to modification with functional groups such as phosphate groups and carboxymethyl groups. However, CNF that has been subjected to modification with functional groups such as phosphate groups and carboxymethyl groups can also be used in the present invention.

Alternatively, for example, the pulp fiber may be mechanically treated by the fibrillation method, and then chemically treated by carboxymethylation, or enzymatically treated. Chemically treated CNF include, for example, iCNF (individualized CNF) (single nano cellulose) having a diameter of 3 to 4 nm, such as TEMPO-oxidized CNF, phosphorylated CNF, and phosphite esterified CNF.

Alternatively, CNF treated only chemically or enzymatically, or CNF treated chemically or enzymatically and then treated mechanically by the fibrillation method may also be used.

[CMC]

In order to prevent CNF from aggregating in the solution, carboxymethyl cellulose (hereinafter referred to as CMC), which is a water-soluble polymer, may be added to the solution.

When CNF is added to an aqueous solvent, microfibril fibers of the CNF bind to each other and aggregate. However, when CMC is added thereto so that CNF and CMC exist together, OH groups of the CNF and OH groups of the CMC form hydrogen bonds, and the electrostatic interaction of the molecular chains and the steric hindrance effect prevent the CNF from aggregating. As a result, CNF can be uniformly dispersed in the solution.

CMC is preferably used because it is obtained from cellulose as a raw material, has moderate biodegradability, and can be incinerated after use, thus being an extremely environmentally friendly material. However, water-soluble polymers other than CMC may be used as long as they can prevent CNF from aggregating in the solution.

CMC is preferably added such that the solution contains 93.000 to 99.790% by mass of water, 0.002 to 0.020% by mass of CNF, and 0.100 to 1.000% by mass of CMC, when the entire solution is 100.000% by mass.

The solution can be impregnated in the range of 100 to 500% by mass, preferably in the range of 200 to 350% by mass, relative to the dry weight of the fiber assembling base material.

EXAMPLES

Hereinafter, the present invention is specifically described referring to examples, but the present invention is not limited to these.

[Preparation of Sample]

First, spunlace nonwoven fabrics (fiber blend; rayon: PET=50:50) of 11 cm by 11 cm having a basis weight of 70 $g/m^2$ manufactured by the spunlace method, and spunbond nonwoven fabrics (fiber blend; nylon) of 11 cm by 11 cm having a basis weight of 30 $g/m^2$ manufactured by the spunbond method were prepared.

Then, under each of the conditions of Examples 1 to 33 and Comparative Examples 1 to 22, a liquid was applied to only one surface of one of the nonwoven fabrics, and the another nonwoven fabric was bonded to the liquid-applied surface of the one nonwoven fabric. After that, the wiping sheets P of Examples 1 to 4 and Comparative Examples 1 to 8 were prepared by thermal drying in a thermostatic bath for 72 hours. The wiping sheets P of Examples 1B and 5 to 33, and Comparative Examples 2B and 9 to 22 were prepared by thermal drying in a thermostatic bath for 24 hours.

The conditions of Examples 1 to 33 and Comparative Examples 1 to 22 are as follows.

Examples 1 and 1B

As shown in FIG. 1A, 1 g of a mechanically treated CNF solution with a concentration of 2.0% was applied to each side of a nonwoven fabric, 4 g in total on the entire periphery, using a micropipette (Nichipet, EXII00-NPX2-1000).

The bonded nonwoven fabrics were both spunlace nonwoven fabrics, and the temperature of the thermostatic bath was 60° C.

Example 2

The bonded nonwoven fabrics were a spunlace nonwoven fabric and a spunbond nonwoven fabric.

The other conditions were the same as those in Example 1.

Examples 3 to 4

As shown in FIG. 1B, a total of 4 g of a mechanically treated CNF solution with a concentration of 2.0% was applied to an entire surface of a nonwoven fabric using a spray.

The other conditions were respectively the same as those in Examples 1 to 2.

Examples 5 to 7

The applied liquids were mechanically treated CNF solutions with concentrations of 0.5%, 1.0%, and 1.5%, respectively.

The other conditions were the same as those in Example 1.

Examples 8 to 11

The temperature of the thermostatic bath was 50° C.

The other conditions were respectively the same as those in Examples 5 to 7 and 1.

Examples 12 to 15

The temperature of the thermostatic bath was 40° C.

The other conditions were respectively the same as those in Examples 5 to 7 and 1.

Examples 16 to 19

The applied liquids were enzymatically treated CNF solutions with concentrations of 0.5%, 1.0%, 1.5%, and 2.0%, respectively.

The other conditions were the same as those in Example 1.

Examples 20 to 23

The temperature of the thermostatic bath was 50° C.

The other conditions were respectively the same as those in Examples 16 to 19.

Examples 24 to 27

The temperature of the thermostatic bath was 40° C.

The other conditions were respectively the same as those in Examples 16 to 19.

Examples 28 to 29

The applied liquids were TEMPO-oxidized CNF solutions with concentrations of 0.5% and 1.0%, respectively.

The other conditions were the same as those in Example 1.

Examples 30 to 31

The temperature of the thermostatic bath was 50° C.

The other conditions were respectively the same as those in Examples 28 to 29.

Examples 32 to 33

The temperature of the thermostatic bath was 40° C.

The other conditions were respectively the same as those in Examples 28 to 29.

Comparative Example 1

The bonded nonwoven fabrics were both spunbond nonwoven fabrics.

The other conditions were the same as those in Example 1.

Comparative Examples 2 to 4 and 2B

The applied liquids were CMC solutions with a concentration of 2.0%.

The other conditions were respectively the same as those in Examples 1 to 2, Comparative Example 1, and Example 1.

Comparative Example 5

As shown in FIG. 1B, a total of 4 g of a mechanically treated CNF solution with a concentration of 2.0% was applied to an entire surface of a nonwoven fabric using a spray.

The other conditions were the same as those in Comparative Example 1.

Comparative Examples 6 to 8

As shown in FIG. 1B, a total of 4 g of a CMC solution with a concentration of 2.0% was applied to an entire surface of a nonwoven fabric using a spray.

The other conditions were respectively the same as those in Comparative Examples 2 to 4.

Comparative Example 9

The applied liquid was purified water.

The other conditions were the same as those in Example 1.

Comparative Examples 10 to 12

The applied liquids were CMC solutions with concentrations of 0.5%, 1.0%, and 1.5%, respectively.

The other conditions were the same as those in Example 1.

Comparative Examples 13 to 17

The temperature of the thermostatic bath was 50° C.
The other conditions were respectively the same as those in Comparative Examples 9 to 12 and 2.

Comparative Examples 18 to 22

The temperature of the thermostatic bath was 40° C.
The other conditions were respectively the same as those in Comparative Examples 9 to 12 and 2.

Using the above sheets of Examples and Comparative Examples, the following Tests 1 to 6 were conducted.

[Test 1. Comparison of Partial Application and Entire Surface Application, and Optimal Combination of Nonwoven Fabrics]

The following tests were conducted for Examples 1 to 4 and Comparative Examples 1 to 8.

[Evaluation Method]

Samples of Examples 1 to 4 and Comparative Examples 1 to 8 were each cut into a test piece of 25 mm in width.

Using a tensile test device (TENSILON RTG1210 manufactured by A&D), an end of each of the nonwoven fabrics that have been bonded was pinched with a Chuck (a test material) of the tensile test device. Then, under the conditions of a distance between Chucks of 50 mm and a speed of 500 mm/min, the maximum load point was measured when the bonded sheet materials were peeled off. Such tests were conducted three times for each of the examples and comparative examples, and the average value of the bonding strength was calculated.

The results of the test are shown in Table I and Table II.

[Evaluation]

When Examples 1 to 2 are compared to Comparative Example 1 in Table I and Examples 3 to 4 are compared to Comparative Example 5 in Table II, it is found that the bonding strength is stronger when at least one of the nonwoven fabrics is a spunlace nonwoven fabric.

This strong bonding strength is assumed to result from the fact that the spunlace nonwoven fabric used above is a nonwoven fabric made of 50% rayon and 50% PET, and the rayon fiber, which has a similar molecular structure to CNFs, forms strong hydrogen bonds. On the other hand, the spunbond nonwoven fabric used above made of 100% nylon, which forms less hydrogen bonds than rayon, is assumed to result in the weak bonding strength.

Also, when Examples 1 to 2 in Table I are respectively compared to Examples 3 to 4 in Table II, it is found that when nonwoven fabrics of the same production method are bonded using the same amount of the CNF solution, the bonding strength is improved by application of the CNF solution on the entire periphery.

Also, when Examples 1 to 2 are respectively compared to Comparative Examples 2 to 3 in Table I and Examples 3 to 4 are respectively compared to Comparative Examples 6 to 7 in Table II, it is found that the bonding strength is improved by thermal drying after application of not a CMC solution but a CNF solution.

[Test 2. Examination of Concentration of Mechanically Treated CNF Solution, Drying Temperature, and Bonding Strength]

Next, a test similar to Test 1 was conducted for the samples of Examples 1B and 5 to 15. The results of the test are shown in Table III.

TABLE I

| Partial Application | Spunlace/Spunlace | Spunbond/Spunlace | Spunbond/Spunbond |
| --- | --- | --- | --- |
| 2.0% CNF | (Example 1) 7.8N | (Example 2) 1.7N | (Comparative Example 1) 1.0N |
| 2.0% CMC | (Comparative Example 2) 1.0N | (Comparative Example 3) 0.8N | (Comparative Example 4) 1.0N |

TABLE II

| Entire Surface Application | Spunlace/Spunlace | Spunbond/Spunlace | Spunbond/Spunbond |
| --- | --- | --- | --- |
| 2.0% CNF | (Example 3) 3.3N | (Example 4) 1.8N | (Comparative Example 5) 0.2N |
| 2.0% CMC | (Comparative Example 6) 0.8N | (Comparative Example 7) 0.2N | (Comparative Example 8) 0.8N |

TABLE III

| Partial Application | Mechanically Treated CNF 0.5% | Mechanically Treated CNF 1.0% | Mechanically Treated CNF 1.5% | Mechanically Treated CNF 2.0% |
|---|---|---|---|---|
| 60° C. | (Example 5) 6.69N | (Example 6) 8.51 N | (Example 7) 9.83N | (Example 1B) 12.96N |
| 50° C. | (Example 8) 5.82N | (Example 9) 7.87N | (Example 10) 8.09N | (Example 11) 10.00N |
| 40° C. | (Example 12) 5.65N | (Example 13) 7.01 N | (Example 14) 7.64N | (Example 15) 9.65N |

[Evaluation]

When Examples 1B and 5 to 15 in Table III are compared, it is found that, the higher the concentration of the mechanically treated CNF solution, the higher the bonding strength.

Also, as for the mechanically treated CNF solution, it is found that the bonding strength was highest when the solution was dried at a temperature of 60° C. in a thermostatic bath.

Also, when Example 1 is compared to Example 1B, it is found that thermal drying in a thermostatic bath at 60° C. for 72 hours resulted in thermal degradation, and as a result, the bonding strength was lower than after 24 hours of thermal drying.

[Test 3. Examination of Concentration of Enzymatically Treated CNF Solution, Drying Temperature, and Bonding Strength]

Next, a test similar to Test 1 was conducted for the samples of Examples 16 to 27. The results of the test are shown in Table IV.

TABLE IV

| Partial Application | Enzymatically Treated CNF 0.5% | Enzymatically Treated CNF 1.0% | Enzymatically Treated CNF 1.5% | Enzymatically Treated CNF 2.0% |
|---|---|---|---|---|
| 60° C. | (Example 16) 1.93N | (Example 17) 3.67N | (Example 18) 5.99N | (Example 19) 9.78N |
| 50° C. | (Example 20) 2.88N | (Example 21) 4.06N | (Example 22) 5.11 N | (Example 23) 6.34N |
| 40° C. | (Example 24) 2.82N | (Example 25) 4.27N | (Example 26) 5.60N | (Example 27) 6.55N |

[Evaluation]

When Examples 16 to 27 in Table IV are compared to each other, it is also found that, the higher the concentration of the enzymatically treated CNF solution, the higher the bonding strength.

Also, as for the enzymatically treated CNF solution with the concentration between 1.5 to 2.0%, it is found that the bonding strength is highest when the solution is dried at a temperature of 60° C. in a thermostatic bath.

[Test 4. Examination of Concentration of TEMPO-Oxidized CNF, Drying Temperature, and Bonding Strength]

Next, a test similar to Test 1 was conducted for the samples of Examples 28 to 33. The results of the test are shown in Table V.

TABLE V

| Partial Application | TEMPO-oxidized CNF 0.5% | TEMPO-oxidized CNF 1.0% |
|---|---|---|
| 60° C. | (Example 28) 6.24N | (Example 29) 6.63N |
| 50° C. | (Example 30) 4.89N | (Example 31) 5.92N |
| 40° C. | (Example 32) 4.07N | (Example 33) 5.22N |

[Evaluation]

When Examples 28 to 33 in Table V are compared to each other, it is also found that, the bonding strength does not change largely depending on the concentration of the TEMPO-oxidized CNF.

Also, as for the TEMPO-oxidized CNF, it is found that the bonding strength was highest when the solution was dried at a temperature of 60° C. in a thermostatic bath.

[Test 5. Examination of Bonding Strength upon Application of Liquid Including No CNF]

Next, a test similar to Test 1 was conducted for the samples of Comparative Examples 2B and 9 to 22. The results of the test are shown in Table VI.

TABLE VI

| Partial Application | Purified Water | CMC 0.5% | CMC 1.0% | CMC 1.5% | CMC 2.0% |
|---|---|---|---|---|---|
| 60° C. | (Comparative Example 9) 0N | (Comparative Example 10) 0.19N | (Comparative Example 11) 0.22N | (Comparative Example 12) 0.32N | (Comparative Example 2B) 0.49N |

TABLE VI-continued

| Partial Application | Purified Water | CMC 0.5% | CMC 1.0% | CMC 1.5% | CMC 2.0% |
|---|---|---|---|---|---|
| 50° C. | (Comparative Example 13) 0N | (Comparative Example 14) 0.17N | (Comparative Example 15) 0.19N | (Comparative Example 16) 0.30N | (Comparative Example 17) 0.41N |
| 40° C. | (Comparative Example 18) 0N | (Comparative Example 19) 0.18N | (Comparative Example 20) 0.19N | (Comparative Example 21) 0.28N | (Comparative Example 22) 0.36N |

[Evaluation]

From Comparative Examples 2B and 9 to 22 in Table VI, it is found that application of a liquid including no CNF results in almost no bonding strength even after thermal drying.

Thus, from Tests 1 to 5, it is found that the bonding strength of nonwoven fabrics is increased by application of CNF solution and thermal drying.

Also, from Tests 2 to 4, it is found that the CNF solution with the concentration between 0.5% and 2.0% can provide sufficient bonding strength regardless of the fibrillation method. Among them, it is found that the maximum bonding strength can be provided by application of the CNF solution with the concentration of 2.0% as for the mechanically treated CNF and the enzymatically treated CNF, and by application of the CNF solution with the concentration of 1.0% as for the TEMPO-oxidized CNF.

Effect of Embodiment

In the processes of producing the wiping sheet P, the CNF solution is applied to a bonded part of adjacent nonwoven fabrics, at least one of the adjacent nonwoven fabrics is a spunlace nonwoven fabric, and the superposed nonwoven fabrics are thermally dried, so that the wiping sheet P having a multilayered structure can be formed.

[Test 6. Examination of Softness of Nonwoven Fabric]

The following tests were conducted for the samples of Examples 1 to 2 and Comparative Examples 23 to 24.

Comparative Example 23 was the same as Example 1, except that the CNF application was changed to heat sealing. That is, the bonded nonwoven fabrics were both spunlace nonwoven fabrics, and, instead of the application of 1 g of a mechanically treated CNF solution with a concentration of 2.0% to each side of a nonwoven fabric, 4 g in total on the entire periphery, using a micropipette (Nichipet, EXII00-NPX2-1000) as shown in FIG. 1A in Example 1, the two nonwoven fabrics were bonded together by heat fusion by briefly applying heat of about 200° C. by means of a heat sealer. Comparative Example 24 was the same as Comparative Example 23, except that the nonwoven fabric was changed to a spunlace nonwoven fabric and a spunbond nonwoven fabric.

(Sensory Evaluation of Softness)

Test pieces of Examples 1 to 2 and Comparative Examples 23 to 24 were compared with respective corresponding non-bonded nonwoven fabrics by ten testers, and were evaluated regarding their softness.

The test result was set as AA when seven or more out of the ten testers answered that the sheet was as soft as or softer than the non-bonded nonwoven fabrics, as CC when seven or more out of the ten testers answered that the sheet was harder than the non-bonded nonwoven fabrics, and as BB in the other cases.

Results of the test are shown in Table VII.

TABLE VII

| Partial Application | Spunlace/Spunlace | Spunbond/Spunlace |
|---|---|---|
| 2.0% CNF Evaluation | (Example 1) AA | (Example 2) AA |
| Heat Fusion Evaluation | (Comparative Example 23) CC | (Comparative Example 24) CC |

[Evaluation]

When Examples 1 to 2 are respectively compared to Comparative Examples 23 to 24 in Table VII, it is found that the nonwoven fabrics after CNF application maintained their softness, but the nonwoven fabrics after thermal fusion could not maintain their softness.

That is, the nonwoven fabrics can be bonded together only by application of a CNF solution and thermal drying, the CNF solution is odorless, and the bonded surface does not coagulate. Therefore, the wiping sheet P having a multilayered structure is easily produced and has a soft bonded surface.

Also, since CNF has hydrophilicity and moisture absorbency, when the wiping sheet P is a wet sheet, it can be impregnated with a chemical solution of water-soluble chemicals quickly and evenly.

Also, since CNF has hydrophilicity and moisture absorbency, when the wiping sheet P is a wet sheet, it can hold a chemical solution at the applied part 1 and can gradually release the chemical solution onto the cleaning surface during wiping.

[Test 7. Examination of Easiness in Wiping with Non-Woven Fabrics]

Samples of Example 1 and Comparative Example 23 were each impregnated with a chemical solution 1 of 200% by weight of the dry weight of the base material to obtain samples of Example 34 and Comparative Example 25, respectively.

The chemical solution 1 was produced by:

(1) preparation of solution A by dissolving aqueous sodium hyaluronate in purified water;

(2) preparation of solution B by dissolving methylparaben, ethylparaben, and propylparaben in propylene glycol;

(3) mixing of solution A and solution B;

(4) addition of cetylpyridinium chloride to the mixture;

(5) addition of aloe extract solution; and (6) addition of sodium citrate.

Table VIII shows the kinds of ingredients and their blend percentages in the chemical solution 1.

TABLE VIII

|  | Example 34 | Comparative Example 25 |
|---|---|---|
| Purified Water | 93.5897% | 93.5897% |
| Sodium Hyaluronate Aqueous Solution | 0.1000% | 0.1000% |
| Aloe Extract Aqueous Solution | 0.0100% | 0.0100% |
| Propylene Glycol | 6.0000% | 6.0000% |
| Methyl Paraben | 0.2000% | 0.2000% |
| Ethyl Paraben | 0.0500% | 0.0500% |
| Propyl Paraben | 0.0200% | 0.0200% |
| Cetylpyridinium Chloride | 0.0300% | 0.0300% |
| Sodium Citrate | 0.0003% | 0.0003% |
| Total | 100.0000% | 100.0000% |

(Sensory Evaluation of Easiness in Wiping)

Samples of Example 34 and Comparative Example 25 were compared with respective corresponding non-bonded nonwoven fabrics by ten testers, and were evaluated regarding the easiness of wiping.

The test result was set as AA when seven or more out of the ten testers answered that it was easy to perform wiping than the non-bonded nonwoven fabrics, as CC when seven or more out of the ten testers answered that it was difficult to perform wiping than the non-bonded nonwoven fabrics, and as BB in the other cases.

Results of the test are shown in Table IX.

TABLE IX

| Partial Application | Spunlace/Spunlace |
|---|---|
| 2.0% CNF Evaluation | (Example 34) AA |
| Heat Fusion Evaluation | (Comparative Example 25) CC |

[Evaluation]

When Example 34 and Comparative Example 34 in Table IX are compared, it is found that easiness in wiping with the nonwoven fabrics was maintained after CNF application, but easiness in wiping with the nonwoven fabrics could not be maintained after thermal fusion.

Although the present invention has been described in detail based on the above embodiments, the present invention is not limited to the above embodiments but can be modified as long as it does not depart from the gist of the present invention.

For example, in the above embodiments, the wiping sheet P is described as being used for wiping body, cleaning, and the like, but is not limited to be used in this way. In addition, depending on the usage, components to be added to the solution are of course changed.

The bonding strength is larger when CNF is applied to the entire periphery of the nonwoven fabric as shown in the example, but it can be strong enough even when it is applied to the entire surface. When CNF is applied to the entire surface, the holding property of chemical solution and moisture absorbency due to CNF can be enhanced, and the wiping sheet P as a wet sheet can be impregnated with a chemical solution more quickly. Therefore, the way how the CNF is applied to the nonwoven fabric can be changed according to the intended use.

The nonwoven fabric in the present invention is not particularly limited in its producing method, composition, or basis weight. Also, whether the wiping sheet P is dry or wet is also not limited.

CNF solution is preferably applied by means of a spray in terms of uniform application to a nonwoven fabric and the like. However, other methods are also applicable as long as they do not impair the effect of the present invention, such as droplet application using a dispenser; roll application where the solution is applied once to a roll and then the roll is brought into contact with the sheet surface for application of the solution; roll transfer using a flexographic or gravure printing machine.

The thermal drying method of the nonwoven fabric may be, for example, a drying method of the nonwoven fabric by directly contacting it on a surface of a heating roll such as a Yankee drum, and such drying methods may be used alone or in combination as necessary, as long as the effects of the present invention are not impaired.

The temperature of the thermostatic bath during the thermal drying is preferably 60° C., in terms of obtaining the strongest bonding strength, but is not limited to this. Sufficient bonding strength can be revealed even when the temperature is set at 40° C. or 50° C.

The wiping sheet P in the above examples has a two-layered structure, and the CNF solution is applied directly to one surface of the nonwoven fabric to be bonded, but the wiping sheet P is not limited to this. The wiping sheet P may have a three-layered structure in which an absorbent material or nonwoven fabric is provided as an intermediate layer, and CNF solution is applied to both surfaces of it for bonding. In this way, the wiping sheet P can be thickened. Also, when an absorbent material is provided as an intermediate layer and the wiping sheet P is a wet sheet, it will enhance the moisture absorbency of the chemical solution.

Although some embodiments of the present invention have been described, the scope of the present invention is not limited to the above mentioned embodiments, but includes the scope of the invention described in the claims and their equivalents.

The present invention can be applied to a wiping sheet having a multilayered structure that is easy to manufacture and has a soft bonded surface, and to a method of manufacturing the wiping sheet.

REFERENCE SIGNS LIST

P Wiping Sheet
1 Applied Part
2 Non-Applied Part

The invention claimed is:

1. A wiping sheet, comprising:
a plurality of nonwoven fabrics that are stacked and bonded together, wherein adjacent nonwoven fabrics are bonded at an applied part,
a bond layer applied between adjacent nonwoven fabrics that is provided in the applied part, wherein the bond layer comprises cellulose nanofiber, wherein the cellulose nanofiber contains an anti-aggregation agent,
wherein at least one of the adjacent nonwoven fabrics is a spunlace nonwoven fabric.

2. The wiping sheet according to claim 1 that is a wet sheet.

3. The wiping sheet according to claim 1, wherein the applied part is formed on an entire periphery of the adjacent nonwoven fabrics.

4. The wiping sheet according to claim 1, wherein the adjacent nonwoven fabrics are both spunlace nonwoven fabrics.

5. The wiping sheet according to claim 1, wherein the anti-aggregation agent is carboxymethyl cellulose.

6. A method for producing a wiping sheet, comprising:

applying cellulose nanofiber solution of a concentration of 0.5% to 2.0% to a portion of a surface of a first nonwoven fabric including at least a periphery of the first nonwoven fabric;

superposing the first nonwoven fabric to which the cellulose nanofiber solution is applied and a second nonwoven fabric such that the surface is in contact with the second nonwoven fabric; and drying including thermal drying and bonding of the first nonwoven fabric and the second nonwoven fabric that have been superposed in the superposing, wherein at least one of the first nonwoven fabric and the second nonwoven fabric is a spunlace nonwoven fabric.

7. The method for producing a wiping sheet according to claim 6, further comprising:

impregnating the wiping sheet with a chemical solution.

8. The method for producing a wiping sheet according to claim 6, wherein, in the applying, the cellulose nanofiber solution is applied by means of a spray.

\* \* \* \* \*